(12) United States Patent
Tran et al.

(10) Patent No.: US 8,134,462 B1
(45) Date of Patent: Mar. 13, 2012

(54) SELF-CONTAINED SENSOR PACKAGE FOR WATER SECURITY AND SAFETY

(75) Inventors: Nghia Tran, San Diego, CA (US); Michael R. Blackburn, Encinitas, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 840 days.

(21) Appl. No.: 12/188,390

(22) Filed: Aug. 8, 2008

(51) Int. Cl.
*G08B 1/08* (2006.01)

(52) U.S. Cl. ............... 340/539.26; 340/10.1; 340/618; 340/602; 340/539; 340/539.22; 340/539.17; 340/539.15; 340/539.16; 340/506; 340/623; 340/426.25

(58) Field of Classification Search ............... 340/10.1, 340/618, 602, 573.16, 539.26, 539.22, 539.17, 340/539.15, 539.16, 506, 623, 426.25
See application file for complete search history.

(56) References Cited

U.S. PATENT DOCUMENTS

| | | | | |
|---|---|---|---|---|
| 3,603,952 A * | 9/1971 | Smith | ............... | 340/539.26 |
| 4,069,405 A * | 1/1978 | Fima | ............... | 200/84 C |
| 4,549,171 A * | 10/1985 | Akiba et al. | ............... | 340/605 |
| 4,563,674 A * | 1/1986 | Kobayashi | ............... | 340/620 |
| 4,663,614 A * | 5/1987 | Rauchwerger | ............... | 340/605 |
| 4,985,696 A * | 1/1991 | Beomont | ............... | 340/618 |
| 5,077,696 A * | 12/1991 | McEachern et al. | ............... | 367/12 |
| 5,229,750 A * | 7/1993 | Welch et al. | ............... | 340/605 |
| 5,264,368 A * | 11/1993 | Clarke et al. | ............... | 436/3 |
| 5,268,668 A * | 12/1993 | Berube | ............... | 340/505 |
| 5,406,256 A * | 4/1995 | Ledel et al. | ............... | 340/539.22 |
| 5,412,622 A * | 5/1995 | Pauer et al. | ............... | 367/154 |
| 5,654,692 A * | 8/1997 | Baxter et al. | ............... | 340/539.17 |
| 5,748,085 A * | 5/1998 | Davis et al. | ............... | 340/572.1 |
| 5,783,989 A * | 7/1998 | Issa et al. | ............... | 340/426.25 |
| 5,900,806 A * | 5/1999 | Issa et al. | ............... | 340/426.25 |
| 6,154,178 A * | 11/2000 | Aslan | ............... | 343/718 |
| 6,371,204 B1 * | 4/2002 | Singh et al. | ............... | 166/250.03 |
| 6,517,026 B1 * | 2/2003 | Smith | ............... | 244/2 |
| 6,529,144 B1 * | 3/2003 | Nilsen et al. | ............... | 341/20 |
| 6,634,229 B1 * | 10/2003 | Kazkaz et al. | ............... | 73/304 R |
| 6,678,107 B1 * | 1/2004 | Krehbiel et al. | ............... | 360/53 |
| 6,725,705 B1 * | 4/2004 | Huebler et al. | ............... | 73/40.5 A |
| 6,816,993 B1 * | 11/2004 | Furuyama | ............... | 714/747 |
| 6,860,288 B2 * | 3/2005 | Uhler | ............... | 137/552 |
| 6,864,789 B2 * | 3/2005 | Wolfe | ............... | 340/539.1 |
| 6,885,299 B2 * | 4/2005 | Cooper et al. | ............... | 340/539.26 |

(Continued)

FOREIGN PATENT DOCUMENTS

EP 170559 A1 * 2/1986

(Continued)

*Primary Examiner* — George Bugg
*Assistant Examiner* — Paul Obiniyi
(74) *Attorney, Agent, or Firm* — Kyle Eppele; J. Eric Anderson

(57) ABSTRACT

Disclosed is a floating sensor system having a casing that encloses a microcontroller. The microcontroller includes a digital processor and a non-volatile memory. The casing also encloses a data bus that connects the microcontroller to an external environment sensor, an RF transceiver, and a battery. The non-volatile memory includes a history file that maintains a record of events sensed by the external environment sensors. The digital processor is configured to establish a pattern of expected external environmental behavior based on the record of events. The digital processor is also configured to emit a signal through the RF transceiver from the system when an unexpected event occurs.

11 Claims, 4 Drawing Sheets

U.S. PATENT DOCUMENTS

| | | | |
|---|---|---|---|
| 6,894,609 B2 * | 5/2005 | Menard et al. | 340/531 |
| 7,042,352 B2 * | 5/2006 | Kates | 340/539.1 |
| 7,142,107 B2 * | 11/2006 | Kates | 340/539.1 |
| 7,142,123 B1 * | 11/2006 | Kates | 340/602 |
| 7,205,892 B2 * | 4/2007 | Luebke et al. | 340/539.26 |
| 7,221,282 B1 * | 5/2007 | Ross et al. | 340/618 |
| 7,230,528 B2 * | 6/2007 | Kates | 340/521 |
| 7,336,168 B2 * | 2/2008 | Kates | 340/539.18 |
| 7,343,136 B2 * | 3/2008 | Liu et al. | 455/66.1 |
| 7,411,494 B2 * | 8/2008 | Kates | 340/539.22 |
| 7,486,183 B2 * | 2/2009 | Luebke et al. | 340/506 |
| 7,504,940 B2 * | 3/2009 | Luebke et al. | 340/539.26 |
| 7,528,711 B2 * | 5/2009 | Kates | 340/506 |
| 7,623,028 B2 * | 11/2009 | Kates | 340/521 |
| 7,817,031 B2 * | 10/2010 | Kates | 340/539.22 |
| 7,846,068 B2 * | 12/2010 | Oshima et al. | 482/8 |
| 7,893,812 B2 * | 2/2011 | Kates | 340/5.8 |
| 7,893,827 B2 * | 2/2011 | Kates | 340/539.1 |
| 7,893,828 B2 * | 2/2011 | Kates | 340/539.14 |
| 7,936,264 B2 * | 5/2011 | Kates | 340/539.22 |
| 2002/0018359 A1 | 2/2002 | Mizuno et al. | 365/154 |
| 2002/0113713 A1 | 8/2002 | Palmer | 340/605 |
| 2003/0007411 A1 | 1/2003 | Fukui et al. | 365/230.03 |
| 2003/0016129 A1 | 1/2003 | Menard et al. | 340/531 |
| 2003/0086315 A1 | 5/2003 | Mizuno et al. | 365/200 |
| 2003/0218540 A1 * | 11/2003 | Cooper et al. | 340/539.26 |
| 2005/0024203 A1 | 2/2005 | Wolfe | 340/539.22 |
| 2005/0179541 A1 | 8/2005 | Wolfe | 340/539.22 |
| 2005/0275527 A1 * | 12/2005 | Kates | 340/539.22 |
| 2005/0275528 A1 * | 12/2005 | Kates | 340/539.22 |
| 2005/0275529 A1 * | 12/2005 | Kates | 340/539.22 |
| 2005/0275530 A1 * | 12/2005 | Kates | 340/539.22 |
| 2005/0279677 A1 * | 12/2005 | Lin | 210/96.1 |
| 2006/0007008 A1 * | 1/2006 | Kates | 340/605 |
| 2006/0125632 A1 * | 6/2006 | Luebke et al. | 340/539.26 |
| 2006/0187073 A1 * | 8/2006 | Lin et al. | 340/636.15 |
| 2006/0197660 A1 * | 9/2006 | Luebke et al. | 340/539.26 |
| 2006/0232401 A1 * | 10/2006 | Lee et al. | 340/539.26 |
| 2006/0261941 A1 | 11/2006 | Drake et al. | |
| 2006/0267756 A1 * | 11/2006 | Kates | 340/521 |
| 2007/0034249 A1 | 2/2007 | Romano et al. | 136/244 |
| 2007/0090946 A1 * | 4/2007 | Kates | 340/539.22 |
| 2007/0139183 A1 * | 6/2007 | Kates | 340/521 |
| 2007/0139208 A1 * | 6/2007 | Kates | 340/602 |
| 2007/0229237 A1 * | 10/2007 | Kates | 340/426.25 |
| 2007/0247307 A1 * | 10/2007 | Riep | 340/539.13 |
| 2008/0042621 A1 * | 2/2008 | Miglioranza | 320/150 |
| 2008/0088201 A1 * | 4/2008 | Konishi et al. | 310/313 D |
| 2008/0111676 A1 * | 5/2008 | Dobbs | 340/506 |
| 2008/0141754 A1 * | 6/2008 | Kates | 73/1.01 |
| 2008/0150733 A1 * | 6/2008 | Snyder et al. | 340/573.6 |
| 2008/0186151 A1 * | 8/2008 | Tsai | 340/310.11 |
| 2008/0278315 A1 * | 11/2008 | Kates | 340/539.17 |
| 2008/0278316 A1 * | 11/2008 | Kates | 340/539.22 |
| 2008/0284590 A1 * | 11/2008 | Kates | 340/539.22 |
| 2008/0285780 A1 * | 11/2008 | Aarts | 381/312 |
| 2009/0153336 A1 * | 6/2009 | Kates | 340/602 |
| 2010/0092125 A1 * | 4/2010 | Kilic et al. | 385/11 |
| 2010/0120584 A1 * | 5/2010 | Oshima et al. | 482/8 |
| 2010/0139575 A1 * | 6/2010 | Duncan et al. | 119/712 |
| 2010/0215511 A1 * | 8/2010 | Eller et al. | 417/44.1 |
| 2011/0090081 A1 * | 4/2011 | Khorashadi et al. | 340/539.13 |

FOREIGN PATENT DOCUMENTS

| | | | |
|---|---|---|---|
| JP | 63044129 A | * | 2/1988 |
| JP | 03266100 A | * | 11/1991 |
| JP | 2003059239 A | * | 2/2003 |
| JP | 2005078453 A | * | 3/2005 |
| JP | 2008064494 A | * | 3/2008 |
| WO | WO 2007017055 A1 | * | 2/2007 |

* cited by examiner

SELF-CONTAINED SENSOR PACKAGE FOR WATER SECURITY AND SAFETY

FEDERALLY-SPONSORED RESEARCH AND DEVELOPMENT

This invention (Navy Case No. 99,064) is assigned to the United States Government and is available for licensing for commercial purposes. Licensing and technical inquiries may be directed to the Office of Research and Technical Applications, Space and Naval Warfare Systems Center, San Diego, Code 2112, San Diego, Calif., 92152; voice 619-553-2778; email T2@spawar.navy.mil.

FIELD OF THE INVENTION

The field of the present subject matter is Water Security Equipment Manufacturing.

BACKGROUND

Some pool safety devices employ sensors of pool surface disturbance caused by a person falling into the pool. One device employs a diaphragm to detect the resulting displacement wave. Another device senses the underwater sound generated by the object falling into the pool. Another device is attached to a potential drowning victim and alerts when the device gets wet. Another device uses the break in a laser beam caused by an object moving across the beam when approaching the pool.

These devices are limited by a number of disadvantages. For example, if the device is mounted on the side of the pool, it restricts free motion about the pool. If the device is mounted under the surface of the water, it restricts access to solar energy and attenuating direct RF communication. If the device must be worn by a cooperating person, it excludes application to most uncooperative potential drowning victims such as unattended children. Most prior art devices require periodic maintenance for alignment, and battery change. As some prior art devices require wires for connectivity to control boxes and alarms, they present a poolside hazard or requiring modifications to the pool construction. Alarm information has not been remotely available. Prior art devices have had no means to adapt their detection criteria and reduce false alarms, nor of improving detection speed and sensitivity.

SUMMARY

The present system overcomes all of the above-mentioned prior art limitations through the integration of microelectronic devices as sensors, photo transducers for energy renewal, embedded logic devices for signal processing, and RF communications for wide distribution of alarm information. A sensor has a solar cell and a battery and uses RF communication to provide remote sensing. The sensor has particular utility in water environments such as swimming pools and open water.

This disclosure describes a technology for producing an integrated sensor device that can be used to collect, process, and transmit information on conditions in a large body of water without the need for infrastructure support such as power or information transmission lines. Such a device could be used for security in a domestic or commercial swimming pool; for remote product security in a commercial fish farm or hatchery; for dock perimeter security on a lake, pond, or wharf; for chemical sensing in a water treatment facility or reservoir; and for other applications in which low cost, low maintenance, and unsupported water environment sensor devices are desired. For clarity in description only, and not to limit the generality of the technology disclosed, the remainder of this disclosure will focus on the pool safety application.

As the present system device exists both in the air and in the water, it can collect sensor information from both domains for integration and improved discrimination of application-relevant events.

Also, because the present system contains an RF network for information communication, the alarm events are detectable anywhere the RF network extends. In a domestic pool security example, most accidental child drowning occurs when no competent adult is within earshot of the pool. The present device could transfer pool event information directly to the location of the responsible adult. In addition, very remote stations can receive alarm information via the Internet. In fish farm applications, a number of fish ponds could be remotely surveyed for water quality, fish stock activity, or predator activity and timely intervention targeted to the contingency.

And because the present system integrates sensors appropriate for the application with embedded computer processors containing signal processing software appropriate for the normal conditions and expected exceptions of the particular application, event sensitivities can be increased while false alarms can be reduced.

DESCRIPTION OF THE ACCOMPANYING FIGURES

DETAILED DESCRIPTION OF THE EMBODIMENTS

Figure 1:
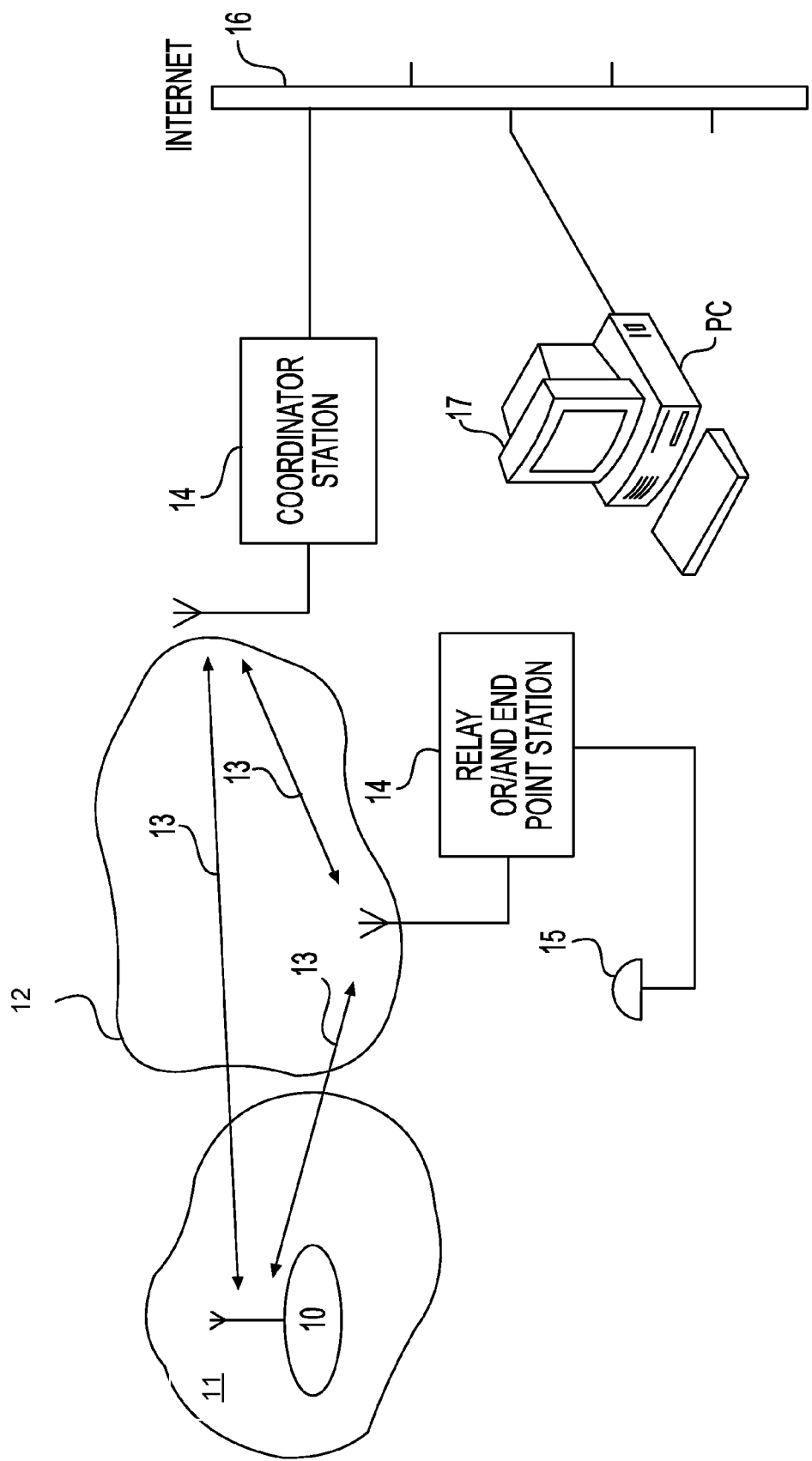
FIG. 1 shows an overview of the inventive system.

With reference to FIG. 1, an integrated sensor device 10 is free-floating or moored in a body of water 11 to float within a restricted region of the surface. The device 10 senses a disturbance or anomaly to the body of water 11 with entry of an unusual element, person, animal, or object. The entry event is immediately analyzed locally and sent via a local network 12 of RF links 13 to receiving stations 14. Alarms 15 may be triggered by the event at the receiving stations 14 if the disturbance is not expected. The alarm generation process is discussed in reference to FIG. 4. Any receiving station 14 may send alarm information via the Internet 16 to targeted sites 17.

Figure 2:
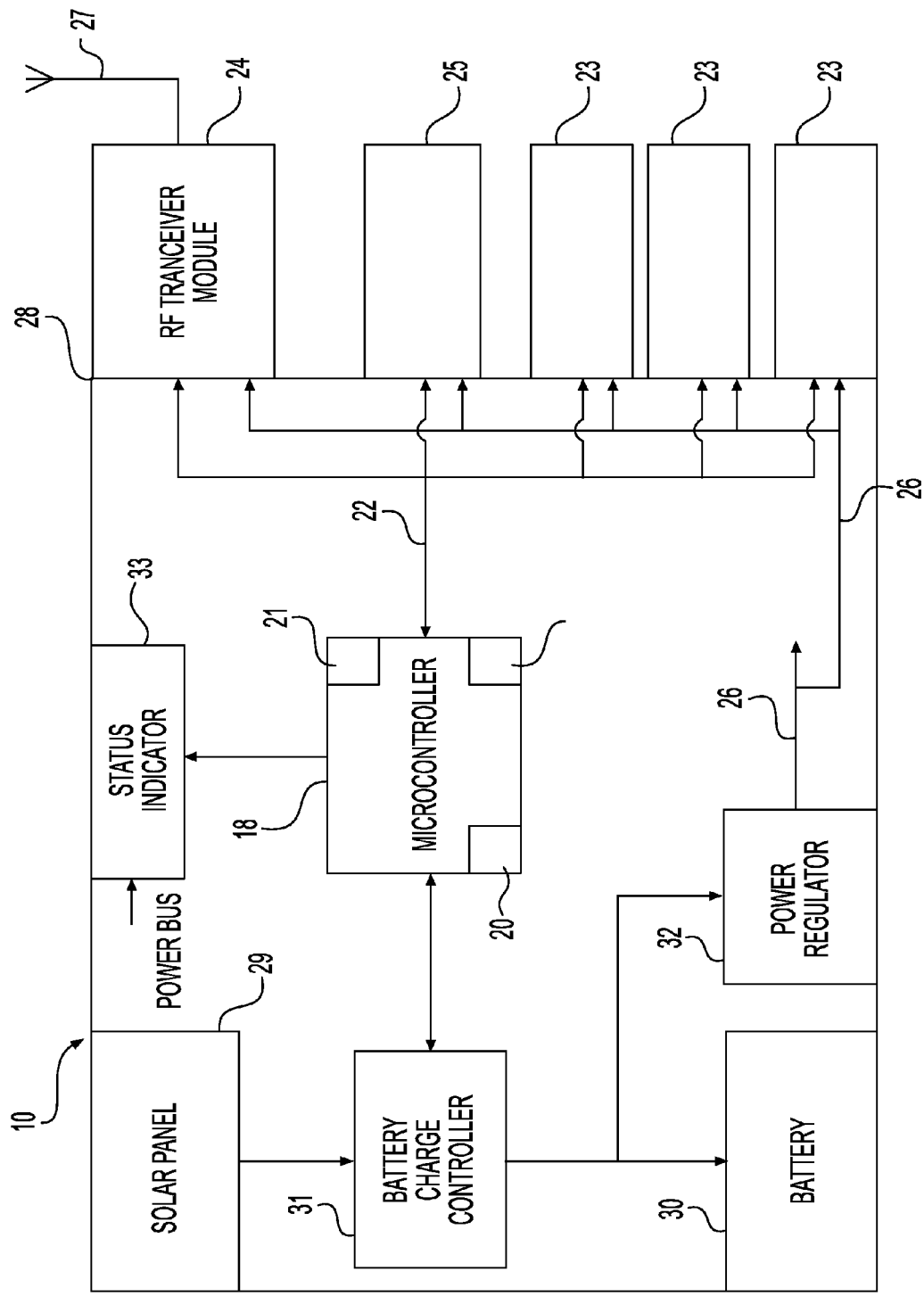
FIG. 2 shows a block diagram describing embedded electronic components and operation of a Remote Sensor Floating Device [1]

With respect to FIG. 2, the sensor device 10 is surrounded by casing 28 includes a microcontroller 18 as the main processing unit and contains a digital processor 19, a non-volatile memory 20, and power-up logic circuit 21 for automatic activation of the sensor device 10 after any power interruptions. The microcontroller 18 communicates with various plug-in modules through Data Bus 22. The plug-in modules include sensor modules 23, RF Transceiver Module 24, and additional memory module 25. Alternatively, the motion sensors 24 can be one or a combination of a motion detector, a thermometer, a light sensor, a pH level sensor, a microphone, an air pressure sensor, a hydrophone, a geophone or a Geiger counter or any other sensor capable of detecting physical phenomena.

Each plug-in module is supplied power through Power Bus 26. In the present exemplary embodiment, the microcontroller 18 reads data of the water condition of the body of water 11 from data bus 22, processes the data, logs import data into Memory Module 20, and sends processed data and action decisions to RF Transceiver Modules 24 for wireless transmission to stations 14 or to a wireless network coordinator to monitor.

The two different decisions of interest in the example applications given herein are (1) produce an alarm, and (2) ignore the input. Based on the assumption that users of this system are interested in the detection of events that are extraordinary, the criterion for the production of an alarm (1) should be novelty, while all other sensor events should be ignored. The opposite of novelty is constancy. A constant input pattern should not result in an alarm. Constancy can be determined by preserving samples of the input in long-term memory and comparing them over time. This is a form of adaptation. The memory can be so configured that the frequency of occurrence of ordinary events may be quite low. In this case however, a measure of periodicity can be attached to the event features to improve expectation and reduce the novelty of infrequent events. These two outputs are mutually exclusive, so that if the preponderance of the conditions favors novelty, then an alarm will be activated.

Figure 4:
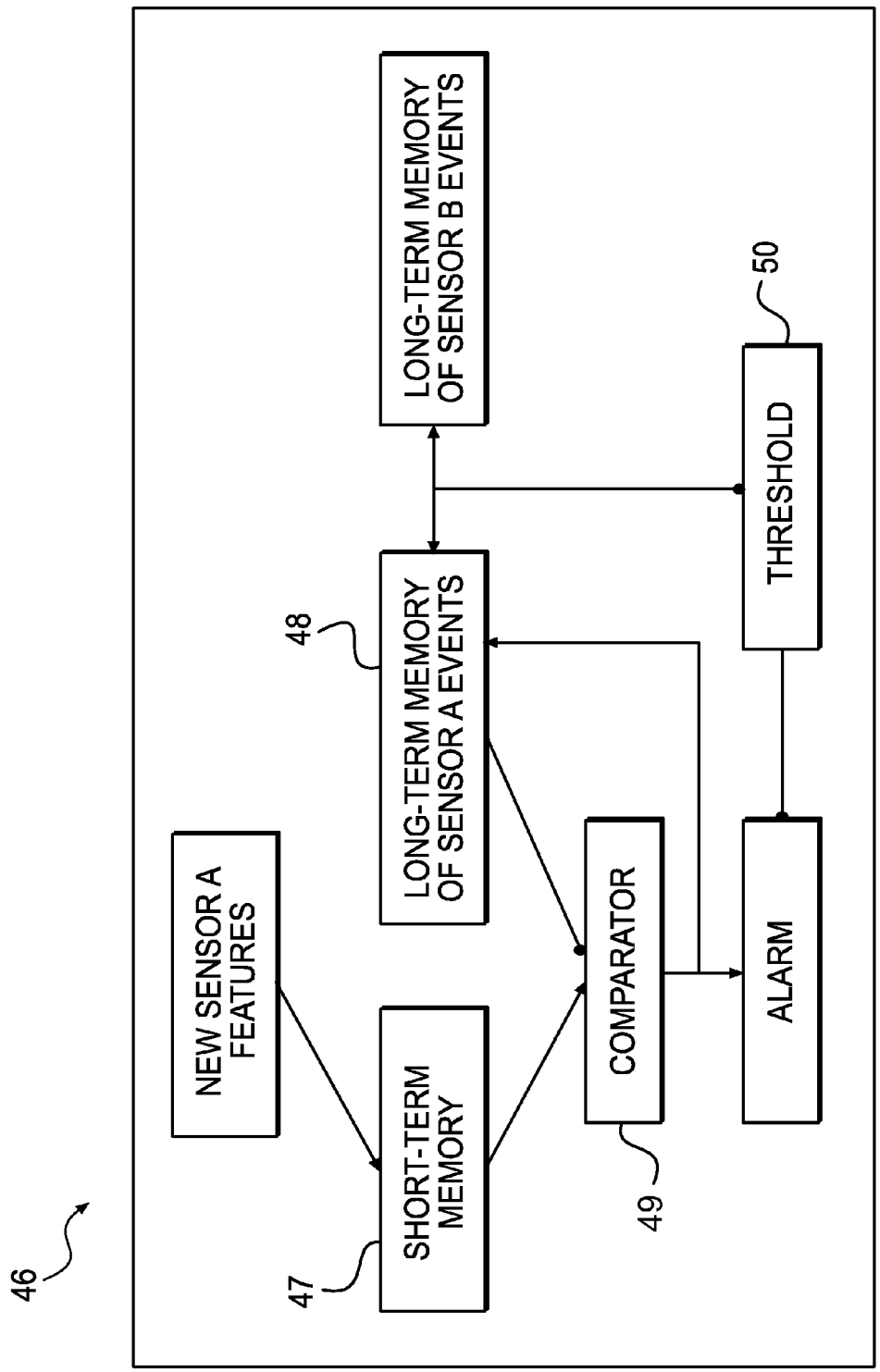
FIG. 4 shows a flow chart of the logic employed in sensor integration and adaptation for the determination of an alarm-worthy event.

FIG. 4 shows a flow chart of the logic employed in sensor integration and adaptation for the determination of an alarm-worthy event. The sensor vector has elements specific to an application as shown in Table 1 below. Table 1 provides a list of potential applications of this invention coupled to a list of possibly relevant sensors for each application.

short-term memory 47. Any remaining differences are sent both back to long-term memory 48 to reinforce existing complex elements or to define new ones, depending upon the degree of novelty detected, and to the alarm 51. The complex elements define event classes which are used to identify expected feature vectors from the sensors. The alarm function outputs an alarm signal only if the differences from the comparator 49 exceed the input from the threshold, indicating that the input did not significantly match a commonly experienced class. There are many different neural network implementations of novelty detectors that can be applied to this process (see "*Novelty Detection: A Review; Part 2: Neural network based approaches*" Markos Markou and Sameer Singh, *Signal Processing* 83(12): 2499-2521 (2003).

When more than one sensor is providing information for the characterization of an event, the class elements in the long-term memories of both feature processing streams can become associated following coincidence learning rules. As each sensor stream is unique to the comparator function, following the model in FIG. 4, and as all sensor streams converge on one threshold alarm integrator 50, the joint occurrence of multi-sensor input could improve the expectation of normal patterns and discrimination of novel events. In this way, for a swimming pool safety alarm, a splash followed by a swimming pattern could inhibit an alarm, while a splash followed by a random flailing pattern, or the absence of a swimming pattern, could indicate the novelty of a person in distress and signal the alarm.

Initially, all inputs are novel and thus the transfer functions from all feature vectors to the novelty detector are initially strong and could generate an alarm. The threshold would function to temper this propensity if it was set to a high level compared to the average intensity of the input. The more signal experience that is stored in long-term memory, the

TABLE 1

| | Sensors | | | | | | |
|---|---|---|---|---|---|---|---|
| Applications | Wave Action | GPS | Acoustic | Chemical | Thermal | Optical/ Turbidity | Radiation |
| Swimming Pool Safety | X | | X | X | X | X | |
| Fish Hatchery Security | X | | X | X | X | X | |
| Wharf Security | X | | X | X | | | X |
| Reservoir Security | X | | X | X | | X | X |
| Ice Flow Assessment | X | X | X | X | X | | |
| Oil Spill Assessment | X | X | | X | X | X | |

In one implementation, the output of each sensor may be decomposed into features. In the acoustic domain, for example, decomposition may be accomplished by frequency resonant filters. Alternatively, Fourier Analysis may be used to extract features. The output of each filter is a measure of the energy of the specified portion of the sensor domain over a particular interval of time. The mean amplitude may be subtracted from amplitudes of each filter. This permits different combinations of positive and negative features that characterize the relative energies of the spectrum. For example, if there are three features, A, B, and C, then the various feature vectors possible are [A,–B,–C], [B,–A,–C], [C,–A,–B], [A,B,–C], [A,C,–B], and [C,B,–A].

New features are accumulated in short-term memory 47. Each feature passively decays over seconds in short-term memory 47, subject to refresh from the sensor output. This activity is passed continuously to the comparator 49 in which inputs from active feature vectors from complex elements in long-term memory 48 are subtracted from the input from more discriminating the system can become, tolerating more noise, and lowering its threshold for novelty detection.

Referring back to FIG. 2, the sensor 23 could be used to measure disturbances in the water level that would result if a child fell into the water 11. As mentioned above, other sensors could be included that assess water temperature, pressure, opacity, and chemistry, and because the device is exposed to both the air and water, ambient sound and light in the air and water. For example, a child falling into the pool would initially generate a characteristic splash signal in the air-acoustic sensor. This may be sufficient to trigger an alarm if such splashes were rare events, if not, the system may base the alarm upon coincidence and confirmation from the wave sensor, or from the subsurface-acoustic sensor.

The RF Transceiver 24 allows the floating device 10 to communicate with the Coordinator/End Point Station 14 of FIG. 1. Information that may be exchanged includes local data on water condition and events, and device configuration information and instructions. The RF Transceiver 24 also provides an ability to connect several devices together forming a wireless network 13 of transceivers. The antenna 27 improves efficiency of the RF signal transmission and reception. The antenna 27 can be embedded completely inside the sensor device 10 or protrude from the device into the air.

A Solar Panel 29 enables the floating device 10 to capture sunlight to recharge its electrical battery 30 through the Battery Charge Controller 31. The Battery 30 stores electrical energy and provides the energy through a Power Regulator 32 and power bus 26 for all operations in the device. The Power Regulator 32 provides a stable power supply, improving component reliability. The microcontroller 18 also monitors power level of the battery 30 and controls battery charging processes. A local status indicator 33 provides a human-perceivable signal of the sensor device's operation. Such an indicator 33 may include a blinking green lamp indicative of normal readiness in the sensor device 10 and also in the network 12, a blinking red lamp indicative of an alarm condition, and an absence of active indicators or a blinking yellow lamp indicative of a failure state within the sensor device 10 or network 12.

Figure 3:
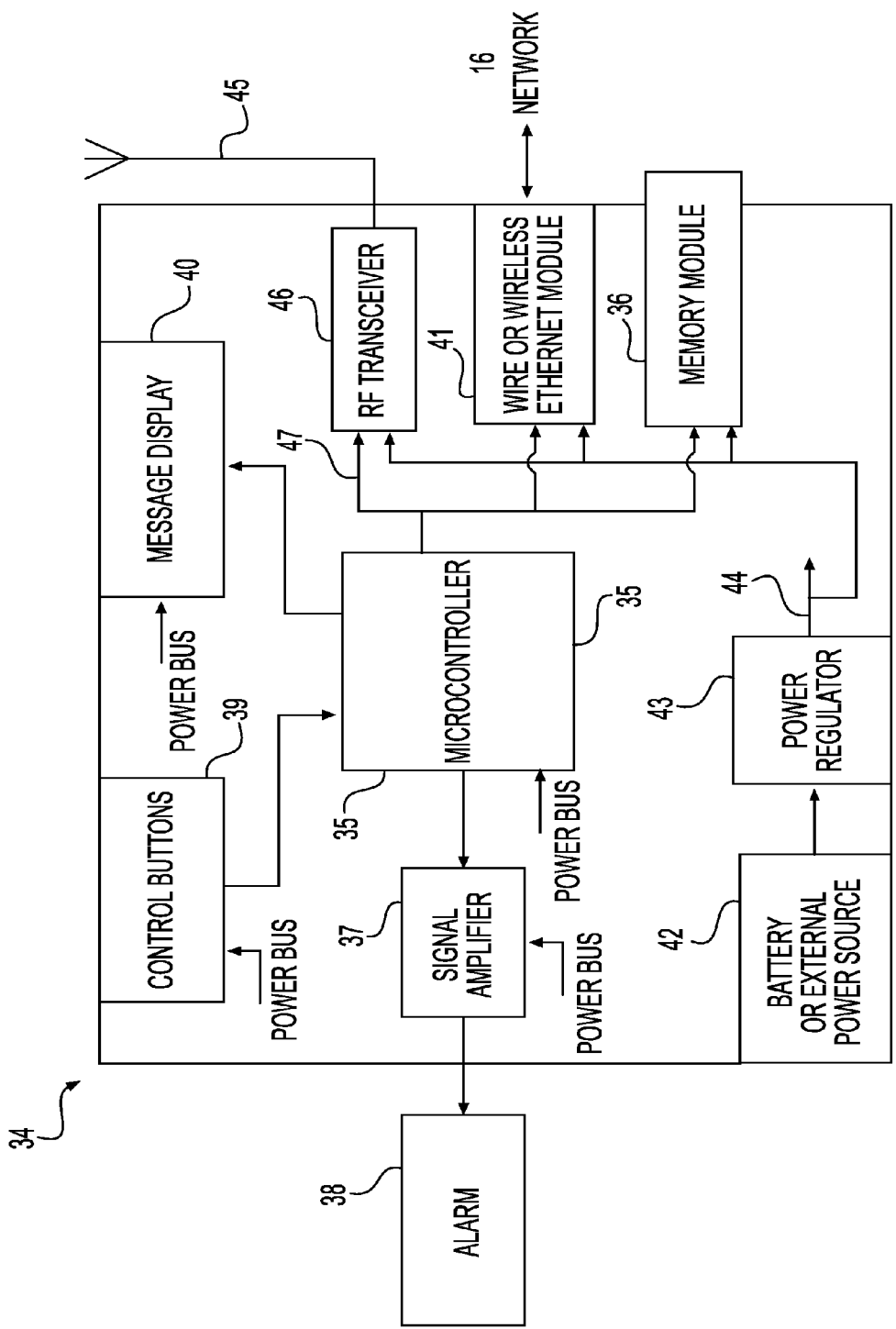
FIG. 3 shows a block diagram of components and operation of a Coordinator/End Point Station.

FIG. 3 shows a block diagram of the components and operation of the Coordinator/End Point Station 34. An end point station antenna 45 receives a signal from the sensor device 10, which is processed by an end point station RF transceiver 46 and passed through data bus 47 to an end point station microcontroller 35. The end point station microcontroller 35 analyzes the data sent from the sensor device 10 and logs important data into end point memory module 36. If an alarm signal is sent, the end point station microcontroller 35 outputs a signal to the signal amplifier 37 to drive an alarm 38. The end point station memory module 36 is a plug-in memory device that allows users to store and transfer data logs to other computer systems for keeping and analyzing data. Control buttons 39 are used for setting and resetting the end point station system by a user. The control buttons 39 may be replaced by a standard computer input device if the End Point Station 34 is in fact a computer. A message display 40 displays and monitors system status and alarm messages. Similarly, the message display 40 may be a conventional computer display. For many long distance monitoring applications, a wire or wireless Ethernet module 41 is helpful. In this embodiment, the Ethernet module 41 connects local stations to a wider network or to the Internet 16. A Battery 42 or external power source in combination with a power regulator 43 and power bus 44 can provide power for the End Point Station 34. The Regulator 43 provides stable power supply, improving component reliability.

The present system is applicable to any unattended sensor network distributed across a body of water for the purpose of monitoring water parameters such as chemistry, temperature, dynamics, and sediment density. The individual sensor packages may be free floating or moored. They may be used to monitor the presence of contaminants, and contaminant distribution, progress, and dissipation. They may be used to assess activity levels of natural water residents such as fish, algae, and crustaceans, and may also indicate the entry and activity of unusual species such as birds, and people. Different types of radios may be employed depending upon the application requirements and bandwidth availability. Micro-impulse radios may be used for non-interference with Marine Navigation bands, and for advantages intrinsic to the technology such as source localization independent of GPS. The sensor packages may be distributed on ice-flows such as glaciers and ice sheets to monitor ice progress and the formation and distribution of icebergs via radio ranging or CPS or both.

The previous description of the disclosed functions is provided to enable any person skilled in the development process for a similar concept to make or use the present inventive subject matter. Various modifications to these functions will be readily apparent and the generic principles defined herein may be applied to additional functions without departing from the spirit or scope of the inventive subject matter. For example, one or more of the sensor system functions can be rearranged and/or combined, or additional functional elements may be added. Thus, the present inventive subject matter is not intended to be limited to the set of functions shown herein but is to be accorded the widest scope consistent with the principles and novel features disclosed herein.

It will be understood that many additional changes in the details, materials, steps and arrangement of parts, which have been herein described and illustrated to explain the nature of the invention, may be made by those skilled in the art within the principle and scope of the invention as expressed in the appended claims.

We claim:

1. A sensor system comprising:
    a casing designed to float on a surface of a body of water;
    a first sensor mounted to the casing, the first sensor configured to generate a first signal representing a characteristic of the water;
    a second sensor mounted to the casing, the second sensor configured to generate a second signal representing a characteristic of an atmosphere above the surface of the water;
    a processor mounted inside the casing, the processor configured to generate and store a pattern that evolves over time of expected external environmental behavior based on the first and second signals, wherein the processor is further configured to generate an alarm signal upon detecting a pattern in the first and second signals that is not found in the pattern of expected external environmental behavior;
    a transceiver configured to transmit the alarm signal;
    an energy source mounted inside the casing, the energy source being operatively coupled to the first and second sensors, the transceiver and the processor; and
    a remote station configured to relay the transmitted alarm signal to a user.

2. The sensor system of claim 1, wherein the remote station is configured to communicate the alarm signal to a remote user via a network of computers.

3. The sensor system of claim 1, wherein the energy source comprises a solar cell and a battery.

4. The sensor system of claim 3, further comprising a status indicator mounted to the casing and operatively coupled to the processor, wherein the status indicator is configured to communicate status information of the sensor system to a user.

5. The sensor system of claim 4, wherein the transceiver is further configured to transmit the status information to the remote station.

6. The sensor system of claim 5, wherein the transceiver is further configured to receive instructions from the remote station.

7. The sensor system of claim 1, wherein the processor comprises:
    a short-term memory configured to receive the first and second signals;
    a first long-term memory configured to store first signal history;
    a second long-term memory configured to store second signal history; and a comparator configured to compare the contents of the short-term memory to the contents of the first and second long-term memories.

8. The sensor system of claim 6, wherein the transceiver is a radio frequency (RF) transceiver.

9. The sensor system of claim 8, wherein the first sensor is selected from the group consisting of a motion detector, a thermometer, a light sensor, a pH level sensor, a microphone, a pressure sensor, a hydrophone, a geophone and a Geiger counter.

10. The sensor system of claim 9, wherein the second sensor is selected from the group consisting of a motion detector, a wind speed detector, a light sensor, a microphone, an air pressure sensor, a thermal detector, and a Geiger counter.

11. The sensor system of claim 1, wherein the first sensor is a sub-surface acoustic sensor and the second sensor is an air-acoustic sensor.

* * * * *